United States Patent
Ishibashi et al.

(10) Patent No.: US 9,184,441 B2
(45) Date of Patent: Nov. 10, 2015

(54) BATTERY ELECTRODE, NONAQUEOUS ELECTROLYTE BATTERY, AND BATTERY PACK

(71) Applicants: Mitsuru Ishibashi, Yokohama (JP); Takuya Iwasaki, Uenohara (JP); Kazuhiro Yasuda, Yokohama (JP); Keigo Hoshina, Yokohama (JP); Yorikazu Yoshida, Yokohama (JP); Hiroki Inagaki, Yokohama (JP); Norio Takami, Yokohama (JP)

(72) Inventors: Mitsuru Ishibashi, Yokohama (JP); Takuya Iwasaki, Uenohara (JP); Kazuhiro Yasuda, Yokohama (JP); Keigo Hoshina, Yokohama (JP); Yorikazu Yoshida, Yokohama (JP); Hiroki Inagaki, Yokohama (JP); Norio Takami, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 13/679,027

(22) Filed: Nov. 16, 2012

(65) Prior Publication Data
US 2013/0122348 A1 May 16, 2013

(30) Foreign Application Priority Data
Nov. 16, 2011 (JP) .................................. 2011-250527

(51) Int. Cl.
*H01M 4/134* (2010.01)
*H01M 4/38* (2006.01)
*H01M 4/485* (2010.01)
*H01M 2/02* (2006.01)
(Continued)

(52) U.S. Cl.
CPC ................ *H01M 4/485* (2013.01); *H01M 2/02* (2013.01); *H01M 4/131* (2013.01); *H01M 10/0525* (2013.01); *H01M 2004/021* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

| | | | |
|---|---|---|---|
| 2006/0046155 A1* | 3/2006 | Inagaki et al. | 429/332 |
| 2007/0009798 A1* | 1/2007 | Inagaki et al. | 429/231.1 |
| 2009/0169997 A1* | 7/2009 | Saruwatari et al. | 429/221 |

FOREIGN PATENT DOCUMENTS

| | | |
|---|---|---|
| CN | 101427416 | 5/2009 |
| JP | 2009-117259 | 5/2009 |
| JP | 2010-55855 | 3/2010 |

OTHER PUBLICATIONS

Armstrong, TiO2(B) nanotubes as negative electrodes for rechargeable lithium batteries, Electrochemical and Solid-State Letters, 9, (3) A139-A143 (2006).*

(Continued)

*Primary Examiner* — Cynthia K Walls
(74) *Attorney, Agent, or Firm* — Oblon, McClelland, Maier & Neustadt, L.L.P.

(57) ABSTRACT

According to one embodiment, a battery electrode includes an active material layer and a current collector is provided. The active material layer contains particles of a monoclinic β-type titanium complex oxide and particles of a lithium titanate having a spinel structure. When a particle size frequency distribution of particles contained in the active material layer is measured by the laser diffraction and scattering method, a first peak $P_1$ appears in a range of 0.3 μm to 3 μm and a second peak $P_2$ appears in a range of 5 μm to 20 μm in the frequency distribution diagram. The ratio $F_{P1}/F_{P2}$ of the frequency $F_{P1}$ of the first peak $P_1$ to the frequency $F_{P2}$ of the second peak $P_2$ is 0.4 to 2.3.

19 Claims, 6 Drawing Sheets

(51) Int. Cl.
*H01M 4/131* (2010.01)
*H01M 10/0525* (2010.01)
*H01M 4/02* (2006.01)

(56) References Cited

OTHER PUBLICATIONS

Graham Armstrong, et al., "$TiO_2$(B) Nanotubes as Negative Electrodes for Rechargeable Lithium Batteries", Electrochemical and Solid-State Letters, 9 (3), 2006, pp. A139-A143.
Rene Marchand, et al., "$TiO_2$(B) a New Form of Titanium Dioxide and the Potassium Octatitanate $K_2Ti_8O_{17}$", Material Research Bulletin, vol. 15, No. 8, 1980, pp. 1129-1133.

Office Action as received in the corresponding Japanese Patent Application No. 2011-250527 dated Feb. 5, 2015 w/English Translation.
Office Action as received in the corresponding Japanese Patent Application No. 2011-250527 dated Dec. 9, 2014 w/English Translation.
Office Action as received in the corresponding Japanese Patent Application No. 2001-250527 dated Sep. 2, 2014 w/English Translation.
Office Action as received in the corresponding Chinese Patent Application No. 201210376273.7 dated Aug. 1, 2014 w/English Translation.
A. Robert Armstrong, et al., "$TiO_2$-B nanowires as negative electrodes for rechargeable lithium batteries", Journal of Power Sources, 146, (2005), 501-506.

* cited by examiner

BATTERY ELECTRODE, NONAQUEOUS ELECTROLYTE BATTERY, AND BATTERY PACK

CROSS-REFERENCE TO RELATED APPLICATIONS

This application is based upon and claims the benefit of priority from Japanese Patent Application No. 2011-250527, filed Nov. 16, 2011, the entire contents of which are incorporated herein by reference.

FIELD

Embodiments described herein relate generally to a battery electrode, a nonaqueous electrolyte, and a battery pack.

BACKGROUND

A titanium oxide having a monoclinic β-type structure has recently attracted remarkable attention as a high-capacity negative electrode material. The number of lithium ions which can be inserted into lithium titanate having a spinel structure ($Li_4Ti_5O_{12}$), which has been made practicable, is three per unit chemical formula. In other words, the number of lithium ions which can be inserted is 3/5 per titanium ion. Therefore, the maximum number is theoretically 0.6. Such a lithium titanate having a spinel structure has a theoretical capacity of about 170 mAh/g.

On the contrary, the number of lithium ions which can be inserted into titanium oxide having a monoclinic β-type structure is a maximum of 1.0 per titanium ion. This titanium oxide therefore provides a theoretical capacity as high as about 330 mAh/g and a reversible capacity as high as about 240 mAh/g. Then, it is considered that the capacity of a battery can be improved by using titanium oxide having a monoclinic β-type structure.

However, the electrode density is difficult to be raised when titanium oxide having a monoclinic β-type structure is used as a negative electrode material. Thus, it is necessary to excessively press the electrode in the production of the electrode. As a result, there is the case where the adhesiveness of the electrode is damaged. Further, the titanium oxide having a monoclinic β-type structure is largely expanded and shrunk when a battery is charged/discharged. For this, the electrode is significantly deteriorated by repeat charging/discharging a number of times. These facts show that there is a problem in that a nonaqueous electrolyte battery using titanium oxide having a monoclinic β-type structure as the negative electrode material has low input/output performance.

DETAILED DESCRIPTION

According to one embodiment, a battery electrode includes an active material layer and a current collector. The active material layer contains particles of a monoclinic β-type titanium complex oxide and particles of a lithium titanate having a spinel structure. When a particle size frequency distribution of particles contained in the active material layer is measured by the laser diffraction and scattering method, a first peak $P_1$ appears in a range of 0.3 μm to 3 μm and a second peak $P_2$ appears in a range of 5 μm to 20 μm in the frequency distribution diagram. The ratio $F_{P1}/F_{P2}$ of the frequency $F_{P1}$ of the first peak $P_1$ to the frequency $F_{P2}$ of the second peak $P_2$ is 0.4 to 2.3.

The embodiment will be explained with reference to the drawings. Structural elements showing the same or similar function throughout all the drawings are designated by the same reference sign and repeating explanations are omitted. Each drawing is a schematic view for explaining the embodiment and for promoting the understanding of the embodiment. Though some parts of shape, dimension and ratio differ from an actual battery, these structural designs may be properly changed taking the following explanations and known technologies into consideration.

(First Embodiment)

Figure 1:
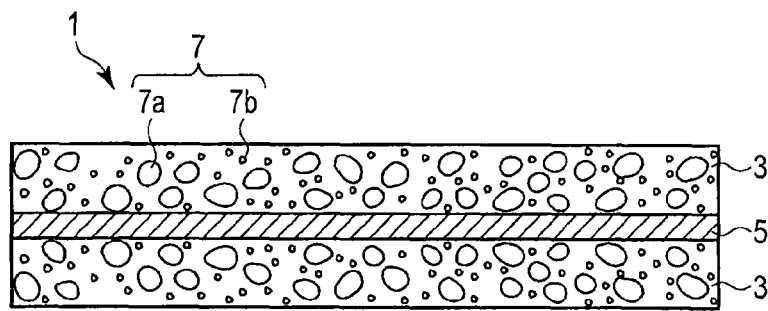
FIG. 1 is a sectional view of an electrode according to a first embodiment.

FIG. 1 is a typical view showing a battery electrode according to a first embodiment. FIG. 1 is a sectional view of a battery electrode.

An electrode 1 contains an active material layer 3 and a current collector 5. The active material layer 3 is formed on each side of the current collector 5. The active material layer 3 contains an active material 7, a conductive agent and a binder (not shown). In this case, the active material layer 3 may be formed on only one surface of the current collector 5. Further, the active material layer 3 may not contain the conductive agent and binder.

The electrode 1 according to the embodiment is preferably used as the electrode for electrolyte secondary battery and more preferably used as the negative electrode.

The active material 7 contains first particles 7a of monoclinic β-type titanium complex oxide and second particles 7b of lithium titanate having a spinel structure.

Here, the monoclinic β-type titanium complex oxide means a titanium-containing complex oxide having the crystal structure of monoclinic titanium dioxide. The crystal structure of the monoclinic titanium dioxide belongs primarily to the space group C2/m, showing a tunnel structure. The detailed crystal structure of monoclinic titanium dioxide is referred to those described in G. Armstrong, A. R. Armstrong, J. Canales, P. G. Bruce, Electrochem. Solid-State Lett., 9, A139 (2006).

The average secondary particle diameter of the first particles 7a is preferably in the range of 5 μm to 20 μm. When the average secondary particle diameter is 5 μm or more, the discharge capacity can be improved. When the average secondary particle diameter is 20 μm or less, sufficient electrode density is kept and the discharge capacity can be improved.

The specific surface area of the first particles 7a is preferably 5 $m^2/g$ to 100 $m^2/g$. When the specific surface area is 5 $m^2/g$ or more, lithium ion insertion/release sites can be sufficiently secured, so that a high capacity can be obtained. When the specific surface area 100 $m^2/g$ or less, deterioration in coulomb efficiency during charging/discharging can be limited. The specific surface area is more preferably 10 $m^2/g$ to 20 $m^2/g$.

Lithium titanate having a spinel structure may be, for example, $Li_4Ti_5O_{12}$.

The average secondary particle diameter of the second particles 7b is preferably in the range of 0.3 μm to 3 μm. When the average particle diameter is 0.3 μm or more, these particles can be easily handled in a manufacturing process. When the average particle diameter is 3 μm or less, a sufficient energy density can be kept, enabling improved discharge capacity.

The specific surface area of the second particles 7b is preferably 5 m$^2$/g to 100 m$^2$/g. When the specific surface area is 5 m$^2$/g or more, lithium ion insertion/release sites can be sufficiently secured, so that a high capacity can be obtained. When the specific surface area is 100 m$^2$/g or less, deterioration in coulomb efficiency during charging/discharging can be limited. The specific surface area is more preferably 10 m$^2$/g to 20 m$^2$/g.

When the particle size frequency distribution of particles contained in the active material layer 3 is measured by the laser diffraction and scattering method, a first peak $P_1$ appears in a range of 0.3 μm to 3 μm and a second peak $P_2$ appears in a range of 5 μm to 20 μm, and the ratio $F_{P1}/F_{P2}$ of the frequency $F_{P1}$ of the first peak $P_1$ to the frequency $F_{P2}$ of the second peak $P_2$ is 0.4 to 2.3.

When the ratio $F_{P1}/F_{P2}$ is 0.4 to 2.3, the electrode density can be easily increased. As a result, the input/output performance (i.e., rate performance) can be improved. When the ratio $F_{P1}/F_{P2}$ is too low, it is difficult to raise the electrode density. For this reason, the energy density of an electrode is decreased. When the ratio $F_{P1}/F_{P2}$ exceeds 2.3, sufficient electrode capacity and sufficient input/output performance are not obtained.

The current collector 5 is formed of a metal foil. The current collector 5 is typically made of an aluminum foil or an aluminum alloy foil containing at least one element such as Mg, Ti, Zn, Mn, Fe, Cu, or Si.

The conductive agent is used to improve the current collective performance of the active material layer 3 and to reduce the contact resistance between the active material layer 3 and the current collector 5. Examples of the conductive agent include acetylene black, carbon black, and graphite. Because graphite has a plate shape and is slippery, the electrode density can be raised without any biased orientation of the first particles. Accordingly, the use of graphite ensures that the electrode density can be raised without much change in peak intensity ratio I(020)/I(001) which will be explained later.

The binder is used to bind the active material with the conductive agent. Examples of the binder include a polytetrafluoroethylene (PTFE), polyvinylidene fluoride (PVdF), fluoro-rubber, and styrene-butadiene rubber. The electrode in this embodiment more preferably contains styrene-butadiene rubber as the binder. Because a styrene-butadiene rubber has higher flexibility than, for example, a polyvinylidene fluoride (PVdF), the electrode density can be raised without any biased orientation of the first particles. Therefore, the use of styrene-butadiene rubber ensures that the electrode density can be raised without much change in peak intensity ratio I(020)/I(001) which will be explained later.

When only particles having a large average secondary particle diameter are contained as active material in the active material layer, it is difficult to raise the electrode density. Therefore, it is necessary to excessively press an electrode in the process of production of the electrode in order to raise the electrode density. However, excess press brings about low adhesiveness between the active material layer and the current collector. As a result, the active material layer is easily peeled from the current collector. Therefore, a battery using such an electrode is significantly deteriorated in input/output performance.

Further, the monoclinic β-type titanium complex oxide is largely expanded and shrunk when charging/discharging a battery. Therefore, an active material layer containing the monoclinic β-type titanium complex oxide singly as an active material is largely changed in volume by charging/discharging of the battery, and as a result, peeling of the active material layer from the current collector is promoted.

However, in the electrode having a structure according to the embodiment, particles having an average particle diameter of about 1 μm enter the void between particles having an average particle diameter of about 10 μm, and therefore, the electrode density can be easily raised. Therefore, it is unnecessary to excessively press the electrode in the process of production of the electrode. The adhesiveness between the active material layer and the current collector can be therefore kept. Further, the increase in electrode density enables improvement in conductivity in the electrode. This ensures that the input/output performance of the battery can be improved.

The particle size frequency distribution of particles in the active material layer can be measured in the following manner.

In the case of measuring before the electrode is produced, slurry for forming an electrode which contains an active material is diluted about 500 times based on mass with a solvent. The diluted solution is stirred or ultrasonic wave is applied to the diluted solution to disperse a solid sufficiently. In this case, the ultrasonic wave is set to have intensity that is unable to destroy active material particles. The obtained dispersion solution is subjected to a measuring device with the laser diffraction and scattering method to obtain a particle size frequency distribution based on volume.

When an electrode is dismounted to measure a frequency distribution, the following procedures are adopted. A part of the active material layer is sampled or the active material layer is peeled from the current collector. Then, the active material layer is heated at a temperature, for example, 200° C. or less, which brings about no change in the composition of the active material and crystal structure, in order to remove organic materials contained in the active material layer, thereby obtaining a sample. Alternatively, organic materials are removed by extraction from the active material layer with a solvent to obtain a sample. As the solvent, for example, dimethylformamide may be used. Similarly to Soxhlet extraction, operations including pressure reduction and heating may be arbitrarily carried out. Then, the sample is diluted about 500 times based on mass with a solvent. The diluted solution is stirred or ultrasonic wave is applied to the diluted solution to disperse a solid sufficiently. In this case, the ultrasonic wave is set to have intensity that is unable to destroy active material particles. The obtained dispersion solution is subjected to a measuring device with the laser diffraction and scattering method in order to obtain a particle size frequency distribution based on volume.

The particle size frequency distribution measured in the above method is considered to be a frequency distribution of the active material containing secondary particles and primary particles. Though peaks derived from other particles such as a conductive agent are possibly measured, they are not considered to affect the value of the ratio $F_{P1}/F_{P2}$.

The electrode can be produced, for example, by the following method. First, the active material, conductive agent, and binder are suspended in a solvent which is generally used, to thereby prepare slurry. This slurry is applied to one or both surfaces of the current collector and dried to form an active material layer. Then, the active material layer is pressed to obtain an electrode. Alternatively, the active material, conductive agent, and binder may be made into a pellet form to make an active material layer, which is then disposed on the current collector, to thereby produce an electrode.

When the electrode is produced, particles having an average secondary particle diameter of about 10 μm and particles having an average particle diameter of about 1 μm are primarily used as the active material to mix, the ratio of these particles to be mixed is controlled to thereby adjust the ratio $F_{P1}/F_{P2}$ to a value of 0.4 to 2.3. At this time, it is desirable that the particles having an average secondary particle diameter of about 10 μm are particles of a monoclinic β-type titanium complex oxide (i.e., the first particles) and the particles having an average particle diameter of about 1 μm are particles of lithium titanate having a spinel structure (i.e., the second particles). When the first particles are used as the particles having an average secondary particle diameter of about 10 μm, the electrode can be designed to have a high capacity.

The monoclinic β-type titanium complex oxide may be synthesized in the following manner. First, an alkali titanate compound such as $Na_2Ti_3O_7$, $K_2Ti_4O_9$, and $Cs_2Ti_5O_{11}$ are subjected to proton exchange to obtain a proton-exchanged compound in which the alkali metal is replaced with a proton. Then, the proton-exchanged compound is heat-treated. A monoclinic β-type titanium complex oxide is thereby obtained. The obtained monoclinic β-type titanium complex oxide may contain alkali metals such as Na, K, or Cs left unremoved at the time of proton exchange. However, the content of these alkali metals is preferably small, and is preferably 2% by mass or less and more preferably 1% by mass or less based on the total mass of the monoclinic β-type titanium complex oxide.

When the electrode 1 is measured by the powder X-ray diffractometry (XRD) using a Cu-Kα ray source, a peak appears in the range of 2θ=48.0° to 49.0° and a peak appears in the range of 2θ=12° to 16°. Here, the peak which appears in the range of 2θ=48.0° to 49.0°, that is, in the range of 2θ=48.5°±0.5° is a peak derived from the (020) plane of a monoclinic β-type titanium complex oxide and is referred to as a peak P(020). The peak which appears in the range of 2θ=12° to 16°, that is, in the range of 2θ=14°±2° is a peak derived from the (001) plane of a monoclinic β-type titanium complex oxide and is referred to as a peak P(001). Here, the peak intensity of peak P(020) is shown by I(020) and the peak intensity of peak P(001) is shown by I(001).

The ratio I(020)/I(001) of intensity I(020) of peak P(020) to intensity I(001) of peak P(001) is preferably 0.89 to 1.1. When the peak intensity ratio I(020)/I(001) is 0.89 or more, the input/output performance are improved. Though there is theoretically no upper limit of the ratio I(020)/I(001), the upper limit is substantially about 1.1. When the peak intensity ratio I(020)/I(001) is 1.1 or less, a sufficient electrode density is secured. This leads to increased energy density and brings about good contact between the active material and conductive agent, resulting in improved input/output performance.

Lithium ions insert into and release from crystals of the monoclinic β-type titanium complex oxide at a right angle with the (020) plane of the crystals. For this reason, the (020) plane is one which allows easy access of lithium ions. Therefore, the input/output performance can be more improved by orientating many more (020) planes on a plane parallel to the surface of the electrode. Further, the peak intensity I(020) becomes larger with increase in the (020) plane orientated on a plane parallel to the surface of the electrode. Accordingly, in such a case, the peak intensity ratio I(020)/I(001) is increased.

For this reason, an electrode having a larger peak intensity ratio I(020)/I(001) has good input/output performance.

An electrode having a peak intensity ratio I(020)/I(001) of 0.89 or more is obtained by controlling press pressure in press treatment when the electrode is produced so as not to excessively increase the electrode density. This reason is that many primary particles of monoclinic β-type titanium complex oxides have fibrous forms and the plane in a direction perpendicular to fiber length is the (020) plane. When the pressure of the press is too large in the press treatment when the electrode is produced, the lengthy axes of fibers of primary particles tend to be orientated parallel to the surface of the electrode, leading to reduction in the (020) planes orientated on a plane parallel to the surface of the electrode. This makes difficult the access of lithium ions to the crystal structure of the monoclinic β-type titanium complex oxide. Thus, the resistance increases and thereby brings about deterioration in input/output performance. Also, in this case, the peak intensity I(020) is small and then, the peak intensity ratio I(020)/I(001) drops because the (020) plane orientated on a plane parallel to the surface of the electrode is reduced. When the pressure of the press is too small on the other hand, the electrode density is too low, leading to decreased energy density as mentioned above.

As mentioned above, the peak intensity ratio I(020)/I(001) can be designed to be 0.89 to 1.1 by controlling press pressure in press treatment when the electrode is produced. When the pressure of the press is increased, the electrode density is raised and the peak intensity ratio I(020)/I(001) is dropped. Alternatively, an electrode having a peak intensity ratio I(020)/I(001) of 0.89 to 1.1 is also obtained by using crystals of a monoclinic β-type titanium complex oxide having many (020) planes.

Next, the measuring method for XRD will be explained. First, an electrode which is a measuring subject is adhered to a glass sample plate. At this time, the electrode may be adhered using a double-sided tape or the like. Much care should be taken to prevent the electrode from being peeled or rising from the sample plate. If necessary, the electrode may be cut into an appropriate size. Then, the sample plate is set to a powder X-ray diffractometer to obtain a diffraction pattern by using Cu-Kα rays. A Si standard sample may be added to the surface of the electrode to correct peak positions.

The active material layer 3 contained in the electrode 1 preferably has a pore volume of 0.20 ml/g to 0.25 ml/g. When the pore volume is 0.20 ml/g or more, the energy density is increased. When the pore volume is less than 0.25 ml/g or less, the electrode density can be raised. The pore volume can be controlled by regulating the pressure of the press in the electrode production process.

The active material layer 3 contained in the electrode 1 preferably has a density of 2.0 g/cm$^3$ to 2.4 g/cm$^3$. Here, the density refers to that of the active material layer after the press treatment in the electrode production process and is also called "electrode density".

When the electrode density is 2.0 g/cm$^3$ or more, a sufficient energy density can be secured. Therefore, a high capacitization effect due to the use of the monoclinic β-type titanium complex oxide can be obtained. When the electrode density is 2.4 g/cm$^3$ or less, the peak intensity ratio I(020)/I(001) can be increased to 0.89 or more. Further, the electrode is smoothly impregnated with the electrolyte solution. Therefore, good input/output performance can be obtained.

When an electrode has an electrode density in the range of 2.0 g/cm$^3$ to 2.4 g/cm3, the peak intensity ratio I(020)/I(001) of the electrode can be in the range of about 0.89 to about 1.1.

According to the above embodiment, a battery electrode which had a high electrode density and which is improved in input/output performance can be provided.

(Second Embodiment)

A nonaqueous electrolyte battery according to a second embodiment will be explained with reference to the drawings.

Figure 2:
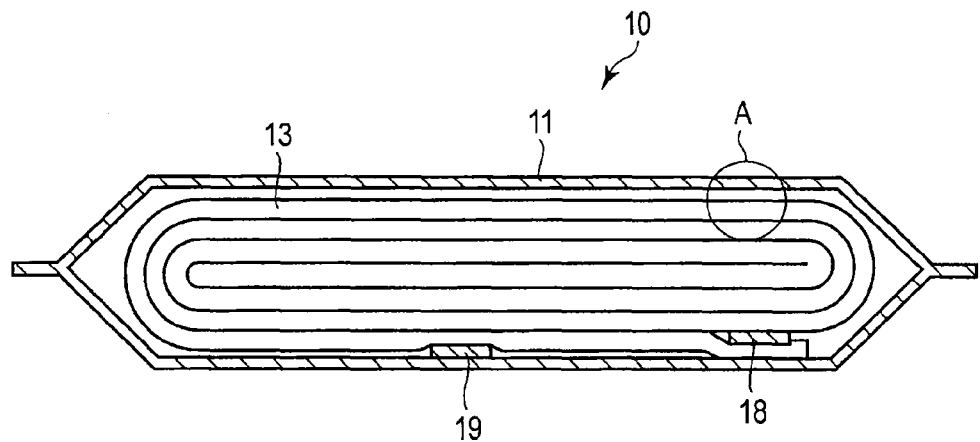
FIG. 2 is a sectional view of a nonaqueous electrolyte secondary battery according to a second embodiment.
Figure 3:
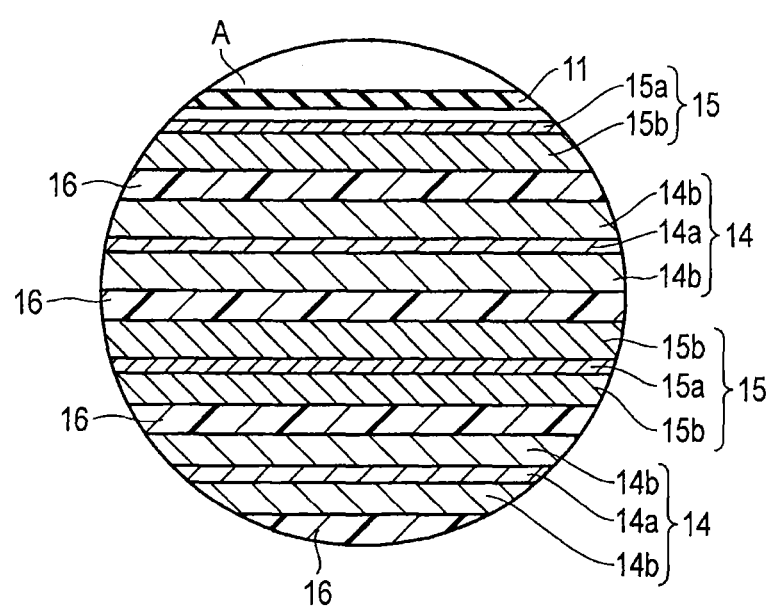
FIG. 3 is an enlarged view of the part A in FIG. 2.

The nonaqueous electrolyte battery according to this embodiment is preferably a nonaqueous electrolyte secondary battery. FIG. 2 shows an example of a nonaqueous electrolyte battery. FIG. 2 is a sectional schematic view of a flat type nonaqueous electrolyte secondary battery. FIG. 3 is an enlarged sectional view of the part A in FIG. 2.

A battery 10 is provided with a container 11, a wound electrode group 13 having flat-shaped, a positive electrode terminal 18, a negative electrode terminal 19, and a nonaqueous electrolyte.

The container 11 is a baggy container made of a laminate film. The wound electrode group 13 is accommodated in the container 11. As shown in FIG. 3, the wound electrode group 13 contains a positive electrode 14, a negative electrode 15, and a separator 16. The wound electrode group 13 is formed by spirally winding a laminate obtained by laminating the negative electrode 15, separator 16, positive electrode 14, and separator 16 in this order, followed by press molding.

The positive electrode 14 contains a positive electrode current collector 14a and a positive electrode active material layer 14b. The positive electrode active material layer 14b contains a positive electrode active material and, optionally, a conductive agent and a binder. The positive electrode active material layer 14b is formed on each side of the positive electrode current collector 14a. Alternatively, the positive electrode active material layer may be formed only on one surface of the positive electrode current collector.

As the positive electrode active material, various oxides, sulfides, and polymers may be used.

Examples of the oxides include those into which lithium ion can be inserted, for example, manganese dioxide ($MnO_2$), iron oxide, copper oxide, nickel oxide, lithium-manganese complex oxides (for example, $Li_xMn_2O_4$ or $Li_xMnO_2$), lithium-nickel complex oxides (for example, $Li_xNiO_2$), lithium-cobalt complex oxides (for example, $Li_xCoO_2$), lithium-nickel-cobalt complex oxides (for example, $LiNi_{1-y}Co_yO_2$), lithium-manganese-cobalt complex oxides (for example, $Li_xMn_yCo_{1-y}O_2$), lithium-nickel-cobalt-manganese complex oxides (for example, $LiNi_{1-y-z}Co_yMn_zO_2$), lithium-nickel-cobalt-aluminum complex oxides (for example, $LiNi_{1-y-z}Co_yAl_zO_2$), lithium-manganese-nickel complex oxides having a spinel structure (for example, $Li_xMn_{2-y}Ni_yO_4$), lithium-phosphorous oxides having an olivine structure (for example, $Li_xFePO_4$, $Li_xFe_{1-y}Mn_yPO_4$, and $Li_xCoPO_4$), iron sulfate ($Fe_2(SO_4)_3$), and vanadium oxide (for example, $V_2O_5$). In the above formula, $0<x\le1$, $0\le y\le1$, and $0\le z\le1$ are preferred. As the active material, these compounds may be used either independently or in combination of two or more.

Further, organic materials and inorganic materials, for example, conductive polymer materials such as a polyaniline or polypyrrole, disulfide based polymer materials, sulfur (S), and fluorocarbon may be used as the positive electrode active material.

As the positive electrode active material, the above compounds may be used either singly or in combination of two or more.

An active material which provides a high positive electrode voltage is more preferable, and examples of the active material include lithium-manganese complex oxides (for example, $Li_xMn_2O_4$), lithium-manganese-nickel complex oxides having a spinel structure (for example, $Li_xMn_{2-y}Ni_yO_4$), lithium-nickel complex oxides (for example, $Li_xNiO_2$), lithium-cobalt complex oxides (for example, $Li_xCoO_2$), lithium-nickel-cobalt complex oxides (for example, $LiNi_{1-y}Co_yO_2$), lithium-manganese-cobalt complex oxides (for example, $Li_xMn_yCo_{1-y}O_2$), lithium-nickel-cobalt-manganese complex oxides (for example, $LiNi_{1-y-z}Co_yMn_zO_2$), and lithium-iron phosphate (for example, $Li_xFePO_4$). In the above formula, $0<x\le1$, $0\le y\le1$, and $0\le z\le1$ are preferred.

The conductive agent improves current-collecting performance and suppresses the contact resistance between the active material and the current collector. Examples of the conductive agent include carbonaceous materials such as acetylene black, carbon black, graphite, carbon nanofiber, or carbon nanotube.

The binder is blended to bind the active material, conductive agent, and the current collector with each other. Examples of the binder include a polytetrafluoroethylene (PTFE), polyvinylidene fluoride (PVdF), and fluoro-rubber.

The active material, conductive agent, and binder in the positive electrode layer are preferably formulated in proportions of 80% by mass to 95% by mass, 3% by mass to 18% by mass, and 2% by mass to 17% by mass, respectively. When the amount of the conductive agent is 3% by mass or more, the aforementioned effect can be produced. When the amount of the conductive agent is 18% by mass or less, the decomposition of the nonaqueous electrolyte on the surface of the conductive agent can be reduced when the battery is stored at high temperatures. When the amount of the binder is 2% by mass or more, sufficient positive electrode strength can be obtained. When the amount of the binder is 17% by mass or less, the formulating amount of the binder which is an insulating material in the electrode can be reduced, making possible to reduce internal resistance.

The positive electrode current collector is preferably made of an aluminum foil or aluminum alloy foil containing at least one element selected from Mg, Ti, Zn, Mn, Fe, Cu and Si.

The positive electrode can be manufactured by the following method. First, a positive electrode active material, conductive agent, and binder are suspended in a proper solvent to prepare slurry. This slurry is applied to one or both surfaces of a positive electrode current collector and dried to form a positive electrode active material layer. Then, the positive electrode active material layer is subjected to pressing. Alternatively, the positive electrode active material, conductive agent, and binder are made into a pellet, which may be used as a positive electrode active material layer.

The negative electrode 15 contains a negative electrode current collector 15a and a negative electrode active material layer 15b. The negative electrode active material layer 15b contains a negative electrode active material, a conductive agent, and a binder. As the negative electrode, the electrode according to the first embodiment is used in this embodiment.

In the example of FIG. 3, the negative electrode 15 is positioned on the outermost periphery of the wound electrode group 13. The part of the negative electrode 15 positioned on the outermost periphery is provided with the negative electrode active material layer 15b only on one internal surface side of the negative electrode current collector 15a. Other part of the negative electrode 15 is provided with the negative electrode active material layer 15b on each side of the negative electrode current collector 15a.

In addition to the monoclinic β-type titanium complex oxide and lithium titanate having a spinel structure, other compounds may be contained as the negative electrode active material. Other examples of the compounds include titanium-containing oxides such as lithium titanate having ramsdellite structure. When the negative electrode active material contains other compounds, the ratio of these compounds is, though not limited to, preferably 5% by mass or less based on the total mass of the negative electrode active material.

The proportions of the active material, conductive agent, and binder in the active material layer are preferably in the ranges of 70% by mass to 96% by mass, 2% by mass to 28% by mass, and 2% by mass to 28% by mass, respectively. When the conductive agent is contained in an amount of 2% by mass or more, the current collective performance of the active material layer can be improved and the large-current performance of a nonaqueous electrolyte battery can be improved. When the binder is contained in an amount of 2% by mass or more, the bindability between the active material layer and the current collector can be improved, leading to good cycle performance. On the other hand, the amounts of the conductive agent and binder are each preferably 28% by mass or less from the viewpoint of high capacitization.

As the separator, a porous film made from materials such as polyethylene, polypropylene, cellulose or polyvinylidene fluoride (PVdF), a synthetic resin nonwoven fabric or the like can be used. A porous film made of polyethylene or polypropylene melts at a certain temperature and can block electric current, and thus it is preferred from the viewpoint of improvement in safety.

As the container, a baggy container formed of a laminate film or a metal container is used.

Examples of the shape of the container include a flat type, angular type, cylinder type, coin type, button type, sheet type, and laminate type. For example, container for miniature batteries to be mounted in mobile electronic devices or container for large batteries to be mounted on two- or four-wheel vehicles may be used.

As the laminate film, a multilayer film prepared by interposing a metal layer between resin films may be used. The metal layer is preferably formed of an aluminum foil or aluminum alloy foil to reduce the weight of the battery. Polymer materials such as polypropylene (PP), polyethylene (PE), nylon or polyethylene terephthalate (PET) may be used for the resin layer. The laminate film can be molded into the form of the container by sealing through thermal fusion. The laminate film preferably has a wall thickness of 0.2 mm or less.

The metal container may be made of aluminum or an aluminum alloy. The aluminum alloy preferably contains at least one element selected from Mg, Zn, Si and the like. When the alloy contains transition metal such as Fe, Cu, Ni or Cr, the content of the transition metal is preferably 1% by mass or less. This enables outstanding improvements in long-term reliability and radiation in a high-temperature environment. The metal container has a wall thickness of preferably 0.5 mm or less and more preferably 0.2 mm or less.

As shown in FIG. 2, a band-shaped positive electrode terminal 18 is connected with the positive electrode current collector 14a in the vicinity of the outer peripheral end of the wound electrode group 13. Further, a band-shaped negative electrode terminal 19 is connected with the negative electrode current collector 15a on the outermost periphery of the wound electrode group 13. The positive electrode terminal 18 and the negative electrode terminal 19 are extended to outside through an opening of the container 11.

The positive electrode terminal 18 is made of a material which is electrically stable at a voltage ranging from 3.0 to 4.5 V (vs Li/Li$^+$) and has conductivity. Here, "V (vs Li/Li$^+$)" means a potential relative to metallic lithium. The positive electrode terminal 18 is preferably made of aluminum or an aluminum alloy containing at least one element such as Mg, Ti, Zn, Mn, Fe, Cu, or Si. The positive electrode terminal 18 is preferably made of the same materials as the positive electrode current collector 14a in order to reduce the contact resistance with the positive electrode current collector 14a.

The negative electrode terminal 19 is made of a material which is electrically stable at a voltage ranging from 1.0 to 3.0 V (vs Li/Li$^+$) and has conductivity. The negative electrode terminal 19 is preferably made of aluminum or an aluminum alloy containing at least one element such as Mg, Ti, Zn, Mn, Fe, Cu, or Si. The negative electrode terminal 19 is preferably made of the same materials as the negative electrode current collector 15a in order to reduce the contact resistance with the negative electrode current collector 15a.

A nonaqueous electrolyte solution is injected into the container 11. The opening of the container 11 is closed by heat sealing with the positive electrode terminal 18 and negative electrode terminal 19 being caught in the sealed opening part to thereby perfectly seal the wound electrode group 13 and nonaqueous electrolyte.

As the nonaqueous electrolyte, a liquid nonaqueous electrolyte or gel-like nonaqueous electrolyte may be used. The liquid nonaqueous electrolyte is prepared by dissolving an electrolyte in an organic solvent. The concentration of the electrolyte is preferably in the range of 0.5 to 2.5 mol/l. The gel-like nonaqueous electrolyte is prepared by forming a complex of the liquid electrolyte and polymer material.

Examples of the electrolyte include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), or bistrifluoromethylsulfonylimide lithium [$LiN(CF_3SO_2)_2$]. These electrolytes may be either singly or in combination of two or more. The electrolyte preferably contains $LiN(CF_3SO_2)_2$.

Examples of the organic solvent include cyclic carbonates such as propylene carbonate (PC), ethylene carbonate (EC), or vinylene carbonate; chain carbonates such as diethyl carbonate (DEC), dimethyl carbonate (DMC) or methylethyl carbonate (MEC); cyclic ethers such as tetrahydrofuran (THF), 2-methyltetrahydrofuran (2MeTHF) or dioxolan (DOX); chain ethers such as dimethoxyethane (DME) or diethoxyethane (DEE); γ-butyrolactone (GBL), acetonitrile (AN) and sulfolane (SL). These organic solvents may be used either singly or in combination of two or more.

More preferable examples of the organic solvent include mixture solvents obtained by blending two or more types selected from the group consisting of propylene carbonate (PC), ethylene carbonate (EC), diethyl carbonate (DEC), dimethyl carbonate (DMC) and methylethyl carbonate (MEC), and mixture solvents containing γ-butyrolactone. A nonaqueous electrolyte battery superior in low-temperature performance can be obtained by using such a mixture solvent.

Examples of the polymer material include a polyvinylidene fluoride (PVdF), polyacrylonitrile (PAN) and polyethylene oxide (PEO).

According to the above embodiment, a nonaqueous electrolyte battery which has a high electrode density and which is improved in input/output performance can be provided.

(Third Embodiment)

Next, a battery pack according to a third embodiment will be explained with reference to the drawings. The battery pack comprises one or more of the above nonaqueous electrolyte batteries (unit cells) according to the above second embodiment. When the battery pack includes two or more unit cells, these unit cells are disposed in such a manner that they are electrically connected in series or in parallel.

Figure 4:
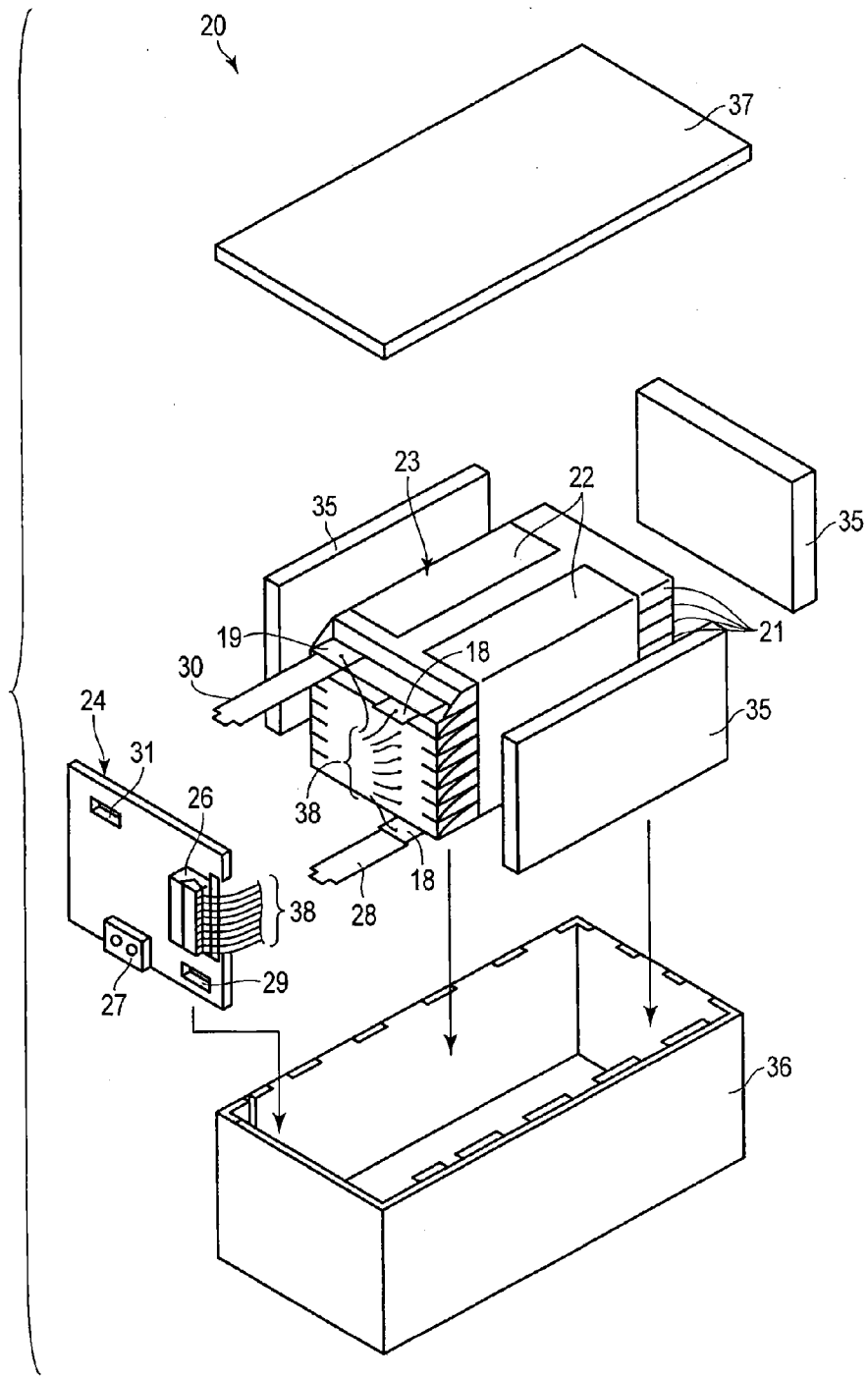
FIG. 4 is an exploded view of a battery pack according to a third embodiment.
Figure 5:
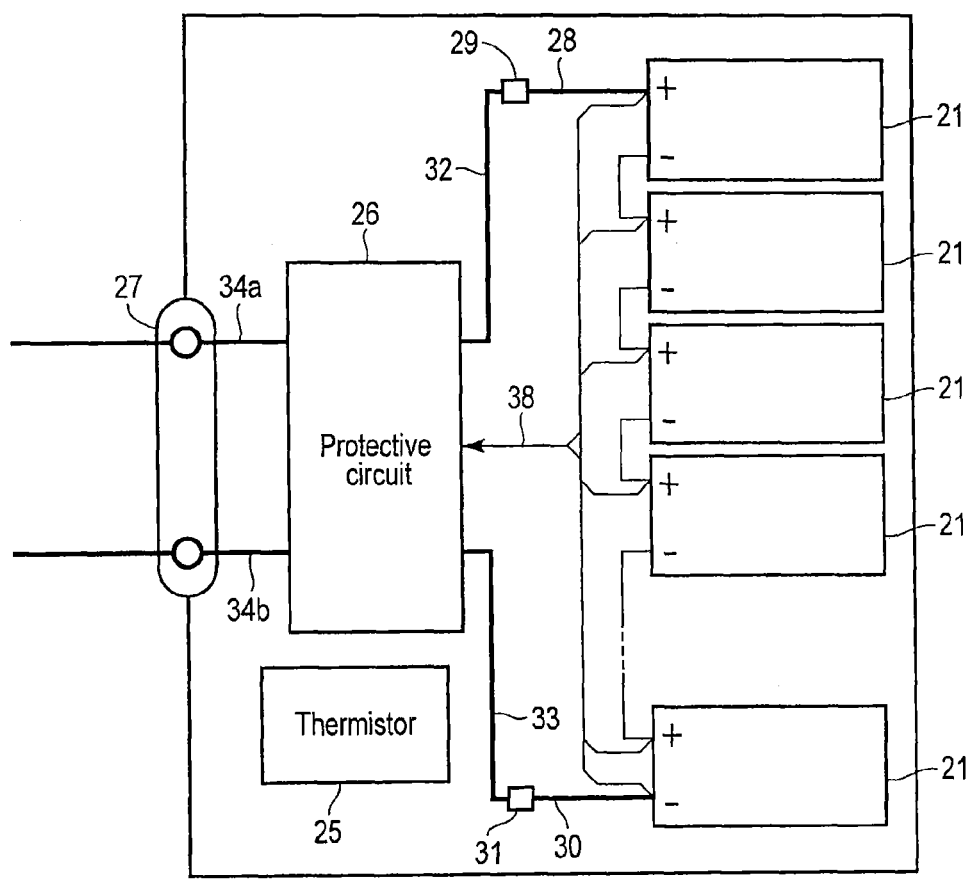
FIG. 5 is a block diagram showing an electric circuit of a battery pack of FIG. 3.

FIGS. 4 and 5 show an example of a battery pack including a plurality of flat type batteries. FIG. 4 is an exploded perspective view of the battery pack 20. FIG. 5 is a block diagram showing an electric circuit of the battery pack 20 shown in FIG. 4.

A plurality of unit cells 21 are laminated such that the externally extended positive electrode terminals 18 and negative electrode terminals 19 are arranged in the same direction and fastened with an adhesive tape 22 to thereby form a battery assembly 23. These unit cells 21 are electrically connected in series as shown in FIG. 5.

A print wiring board 24 is disposed opposite to the side surface of the unit cell 21 from which the positive electrode terminal 18 and the negative electrode terminal 19 are externally extended. As shown in FIG. 5, a thermistor 25, a protective circuit 26 and an energizing terminal 27 connected to external devices are mounted on the print wiring board 24. An insulating plate (not shown) is attached to the surface of the print wiring board 24 facing the battery assembly 23 in order to avoid unnecessary electrical connection with the wiring of the battery assembly 23.

A positive electrode side lead 28 is connected with the positive electrode terminal 18 positioned on the lowermost layer of the battery assembly 23 with its top being inserted into a positive electrode side connector 29 of the print wiring board 24 for electrical connection. A negative electrode side lead 30 is connected to the negative electrode terminal 19 positioned on the uppermost layer of the battery assembly 23 with its top being inserted into a negative electrode side connector 31 of the print wiring board 24 for electrical connection. These connectors 29 and 31 are connected to the protective circuit 26 through wirings 32 and 33 formed on the print wiring board 24.

The thermistor 25 is used to detect the temperature of the unit cell 21 and the detected signals are transmitted to the protective circuit 26.

The protective circuit 26 can shut off a plus side wiring 34a and minus side wiring 34b between the protective circuit 26 and the energizing terminal 27 connected to external devices in a predetermined condition. The predetermined condition means, for example, the case where the temperature detected by the thermistor 25 is above a predetermined one. Further, the predetermined condition means, for example, the case of detecting overcharge, overdischarge and over-current of the unit cell 21. The detections of this overcharge and the like are performed for individual unit cells 21 or whole unit cells 21. When individual unit cells 21 are detected, either the voltage of the battery may be detected or the potential of the positive electrode or negative electrode may be detected. In the latter case, a lithium electrode used as a reference electrode is inserted between individual unit cells 21. In the case of FIGS. 4 and 5, a wiring 38 for detecting voltage is connected to each unit cell 21 and the detected signals are transmitted to the protective circuit 26 through these wirings 38. Because the battery to be mounted on the battery pack of this embodiment excels in controlling the positive electrode and negative electrode by the detection of battery voltage, a protective circuit that detects battery voltage is preferably used.

A protective sheet 35 made of a rubber or resin is disposed on each of the three side surfaces of the battery assembly 23 excluding the side surface from which the positive electrode terminal 18 and negative electrode terminal 19 are projected.

The battery assembly 23 is accommodated in a receiving container 36 together with each protective sheet 35 and print wiring board 24. Specifically, the protective sheet 35 is disposed on each inside surface in the direction of the long side and on one of the inside surfaces in the direction of the short side of the receiving container 36, and the print wiring board 24 is disposed on the other inside surface in the direction of the short side. The battery assembly 23 is positioned in a space enclosed by the protective sheet 35 and the print wiring board 24. A lid 37 is attached to the upper surface of the receiving container 36.

Here, a thermally contracting tape may be used in place of the adhesive tape 22 to secure the battery assembly 23. In this case, after the protective sheet is disposed on both sides of the battery assembly and the thermally contracting tapes are wound around the battery assembly. The thermally contracting tape is contracted by heating to bind the battery assembly.

The structure in which the unit cells 21 are connected in series is shown in FIGS. 4 and 5. However, with regard to these unit cells 21, either series or series-parallel cell connections may be used to increase the capacity of the battery. Series cell connection and parallel cell connection may be combined. The assembled battery packs may be further connected in series or parallel.

According to the above embodiment, a battery pack which has a high electrode density and which is improved in input/output performance can be provided. The aspect of the battery pack is appropriately changed according to applications. The battery pack according to this embodiment is preferably used in applications required to exhibit excellent cycle performance when a large current is extracted. Specific examples of these applications include power sources for digital cameras, and power sources mounted on vehicles such as two- to four-wheel hybrid electric vehicles, two- to four-wheel electric vehicles and assist bicycles. Particularly, the battery pack is preferably used for power sources mounted on vehicles.

EXAMPLES

Example 1

<Production of an Electrode>

Powder of monoclinic β-type titanium complex oxide, powder of lithium titanate having a spinel structure ($Li_4Ti_5O_{12}$), graphite, and a polyvinylidene fluoride (PVdF) were dispersed in N-methylpyrrolidone (NMP) to prepare slurry for forming electrode. The powder of monoclinic β-type titanium complex oxide had an average primary particle diameter of 1 μm or less and an average coagulated particle (secondary particle) diameter of about 10 μm. The average secondary particle diameter of the powder of the lithium titanate having a spinel structure was about 1 μm.

The powder of monoclinic β-type titanium complex oxide, the powder of the lithium titanate having a spinel structure, graphite, and PVdF were formulated in proportions of 46 parts by mass, 46 parts by mass, 4 parts by mass, and 4 parts by mass, respectively. The slurry was applied to each surface of a current collector made of aluminum foil, dried, and then pressed to produce an electrode. The electrode density of the obtained electrode was 2.39 g/cm$^3$.

<Measurement of Particle Size Frequency Distribution>

The particle size frequency distribution of the produced electrode was measured. A part of the active material layer was obtained from the electrode and then subjected to Soxhlet extraction using dimethylformamide to remove a binder component, followed by mixing with NMP. Ultrasonic wave was applied to the mixture using an ultrasonic cleaner to disperse particles. The particle size frequency distribution of this dispersion solution was measured using a laser diffraction and scattering particle size analyzer (trademark: Microtrack MT3000, manufactured by Nikkiso Co., Ltd.). Using the result, the ratio $F_{P1}/F_{P2}$ was calculated. The obtained ratio $F_{P1}/F_{P2}$ was 1.07.

<XRD Measurement>

XRD of the produced electrode was measured using a Cu-Kα ray source. The peak intensity ratio I(020)/I(001) was calculated from the obtained result. The obtained ratio I(020)/I(001) was 0.9.

<Measurement of a Pore Volume>

The pore volume of the produced electrode was measured by the mercury press-in method using a pore distribution analyzer (trademark: Autopore type 9520, manufactured by Shimadzu Corporation). As a result, the pore volume was 0.2091 ml/g.

<Production of an Evaluation Cell>

An evaluation cell was produced in dry argon. The electrode produced above was used as a working electrode and metallic lithium was used as a counter electrode. These electrodes were made to face each other through a glass filter (separator) and put into a three-pole glass cell. Further, a reference electrode made of metallic lithium was inserted in such a manner as not to be in contact with the working electrode and counter electrode. Each of the working electrode, counter electrode, and reference electrode was connected with a terminal of the glass cell. An electrolyte solution was poured into the glass cell and the glass cell was closed in the condition that the separator and electrodes were sufficiently impregnated with the electrolyte solution. As the solvent of the electrolyte solution, a mixture solvent was used. The mixture solvent was prepared by blending ethylene carbonate (EC) with diethyl carbonate (DEC) in a ratio by volume of 1:2. $LiPF_6$ was used as the electrolyte of the electrolyte solution. The concentration of the electrolyte in the electrolyte solution was designed to be 1.0 mol/L.

Examples 2 to 6

Electrodes and evaluation cells were produced in the same manner as in Example 1 except that the press pressure in the production of the electrode was controlled, and the peak intensity ratio I(020)/I(001) and electrode density were changed. The peak intensity ratio I(020)/I(001), electrode density, pore volume of each example are shown in Table 1.

Example 7

An electrode and an evaluation cell was produced in the same manner as Example 1 except that proportions of the powder of the monoclinic β-type titanium complex oxide and the powder of the lithium titanate having a spinel structure which were used in the production of the electrode were changed to 31 parts by mass and 61 parts by mass, respectively. The peak intensity ratio I(020)/I(001), electrode density, and pore volume are shown in Table 1.

Example 8

An electrode and an evaluation cell was produced in the same manner as Example 1 except that proportions of the powder of the monoclinic β-type titanium complex oxide and the powder of the lithium titanate having a spinel structure which were used in the production of the electrode were changed to 61 parts by mass and 31 parts by mass, respectively. The peak intensity ratio I(020)/I(001), electrode density, and pore volume of each example are shown in Table 1.

Comparative Example 1

An electrode and an evaluation cell was produced in the same manner as Example 1 except that the powder of the lithium titanate having a spinel structure was not used but the monoclinic β-type titanium complex oxide powder was only used as the active material. The powder of the monoclinic β-type titanium complex oxide, graphite, and PVdF were formulated in proportions of 92 parts by mass, 4 parts by mass, and 4 parts by mass, respectively. The electrode density of the obtained electrode was 2.25 g/cm³. The particle size frequency distribution, XRD, and pore volume were measured in the same manner as Example 1, and as a result, the ratio $F_{P1}/F_{P2}$ was 0.15, the peak intensity ratio I(020)/I(001) was 0.69, and the pore volume was 0.3002 ml/g.

Comparative Example 2

An electrode and an evaluation cell was produced in the same manner as Example 1 except that the proportions of the powder of the monoclinic β-type titanium complex oxide and the powder of the lithium titanate having a spinel structure were changed to 9 parts by mass and 83 parts by mass, respectively. The electrode density of the obtained electrode was 2.21 g/cm³. The particle size frequency distribution, XRD, and pore volume were measured in the same manner as in Example 1. The results are shown in Table 1.

(Evaluation of Adhesiveness)

Using the electrodes according to Examples 1 to 8 and Comparative Examples 1 and 2, a bending test was made to evaluate the adhesion between the active material layer and current collector. The bending test was made using a cylinder type mandrel bending tester (manufactured by COTEC Corporation). The electrode was wound around a 3-mm-diameter rod at a winding angle of 180 degrees to confirm whether or not cracks were present in the active material layer and whether or not the active material layer was peeled from the current collector.

As a result, neither crack nor peeling was observed in the electrodes according to Examples 1 to 8 and Comparative Example 2. On the other hand, peeling occurred in the electrode according to Comparative Example 1.

(Charge and Discharge Test of a Glass Cell)

Using each evaluation cell according to Examples 1 to 8 and Comparative Examples 1 and 2, a charge/discharge test was conducted in a 25° C. environment. The charge rate was 1C and the discharge rate was 0.2C or 5C. The voltage was in the range of 1.4 to 3.0 V (vs. Li/Li⁺). The capacity ratio (5C/0.2C) was found from the capacity obtained when the discharge rate was 0.2C and capacity obtained when the discharge rate was 5C. The results are shown in Table 1.

TABLE 1

|  | $F_{P1}/F_{P2}$ | I(020)/I(001) | Electrode density (g/cm³) | Pore volume (mL/g) | Capacity ratio (5 C/0.2 C) | Bending test |
|---|---|---|---|---|---|---|
| Example 1 | 1.07 | 0.9 | 2.39 | 0.2091 | 0.72 | Peeling not occurred |
| Example 2 | 1.07 | 0.94 | 2.28 | 0.2176 | 0.75 | Peeling not occurred |
| Example 3 | 1.07 | 0.98 | 2.19 | 0.2296 | 0.76 | Peeling not occurred |
| Example 4 | 1.07 | 1.04 | 2.04 | 0.2297 | 0.76 | Peeling not occurred |

TABLE 1-continued

|  | $F_{P1}/F_{P2}$ | I(020)/ I(001) | Electrode density (g/cm³) | Pore volume (mL/g) | Capacity ratio (5 C/0.2 C) | Bending test |
| --- | --- | --- | --- | --- | --- | --- |
| Example 5 | 1.07 | 0.87 | 2.48 | 0.1895 | 0.54 | Peeling not occurred |
| Example 6 | 1.07 | 1.12 | 1.85 | 0.3102 | 0.65 | Peeling not occurred |
| Example 7 | 2.14 | 0.97 | 2.27 | 0.212 | 0.77 | Peeling not occurred |
| Example 8 | 0.54 | 0.93 | 2.18 | 0.2288 | 0.76 | Peeling not occurred |
| Comparative Example 1 | 0.15 | 0.69 | 2.25 | 0.3002 | 0.41 | Peeling occurred |
| Comparative Example 2 | 6.06 | 1.11 | 2.21 | 0.1895 | 0.47 | Peeling not occurred |

The capacity ratio of each of Examples 1 to 8 was higher than that of Comparative Example 1. Comparative Example 1 was one in which peeling was observed in the bending test. This showed that when the ratio $F_{P1}/F_{P2}$ was too small, inferior adhesion was obtained, resulting in reduced capacity ratio. Also, when the ratio $F_{P1}/F_{P2}$ was too large, the capacity ratio was also reduced.

Each of Examples 1 to 4 and 7 and 8 had a higher capacity ratio than each of Examples 5 and 6. This showed that a higher capacity ratio was obtained when the peak intensity ratio I(020)/I(001) was in the range of 0.89 to 1.1, the electrode density was in the range of 2.0 to 2.4 g/cm³, and the pore volume was 0.20 to 0.25 ml/g.

(XRD Pattern)

Figure 6:
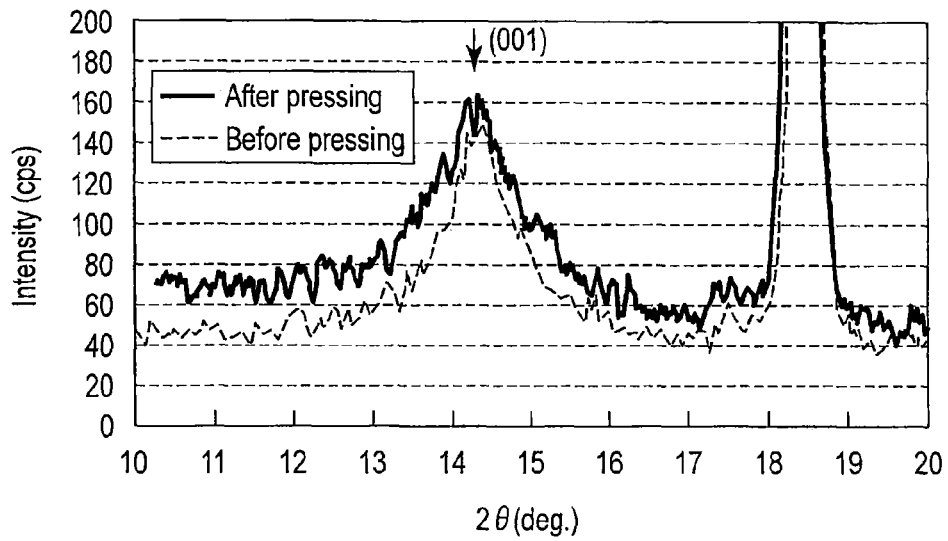
FIG. 6 is an XRD pattern for Example 1.
Figure 7:
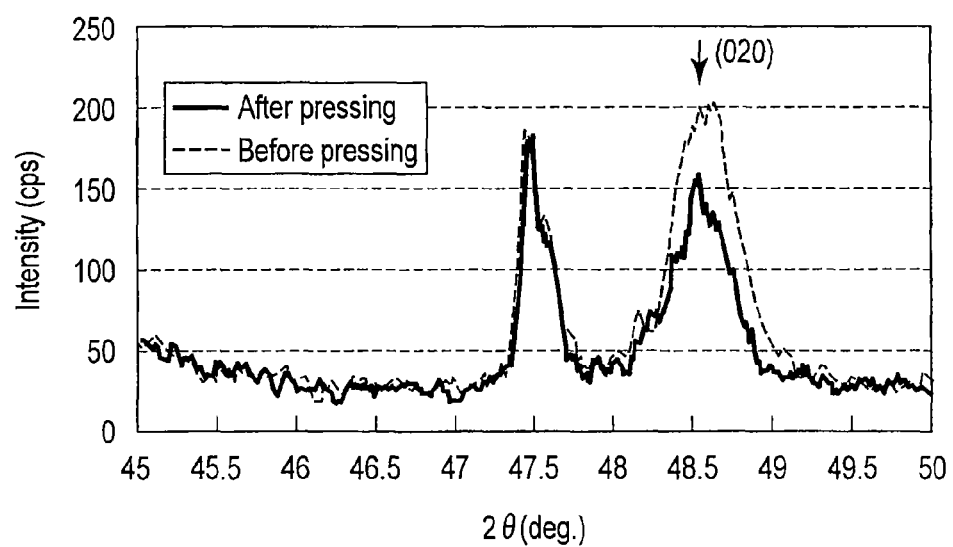
FIG. 7 is an XRD pattern for Example 1.

FIGS. 6 and 7 show the XRD patterns of the electrode manufactured in the same manner as in Example 1 before and after the electrode is pressed. The density of this electrode was 1.31 g/cm³ before the electrode was pressed and 2.25 g/cm³ after the electrode was pressed. The measurement was made using a Cu-Kα ray source in the same manner as explained above.

In FIG. 6, a peak derived from the (001) plane appears in the range of 2θ from 13° to 16°. In FIG. 7, a peak derived from the (020) plane appears in the range of 2θ from 48° to 49°. It is shown from FIG. 6 that the peaks derived from the (001) plane before and after the electrode is pressed are not so different from each other. On the other hand, FIG. 7 shows that the peak derived from the (020) plane is reduced by pressing. Therefore, after pressing, the peak intensity ratio I(020)/I(001) becomes lower than that before pressing. Thus, it is shown that the peak intensity ratio I(020)/I(001) can be controlled by pressing, as mentioned above.

<Particle Size Frequency Distribution Graph>

Figure 8:
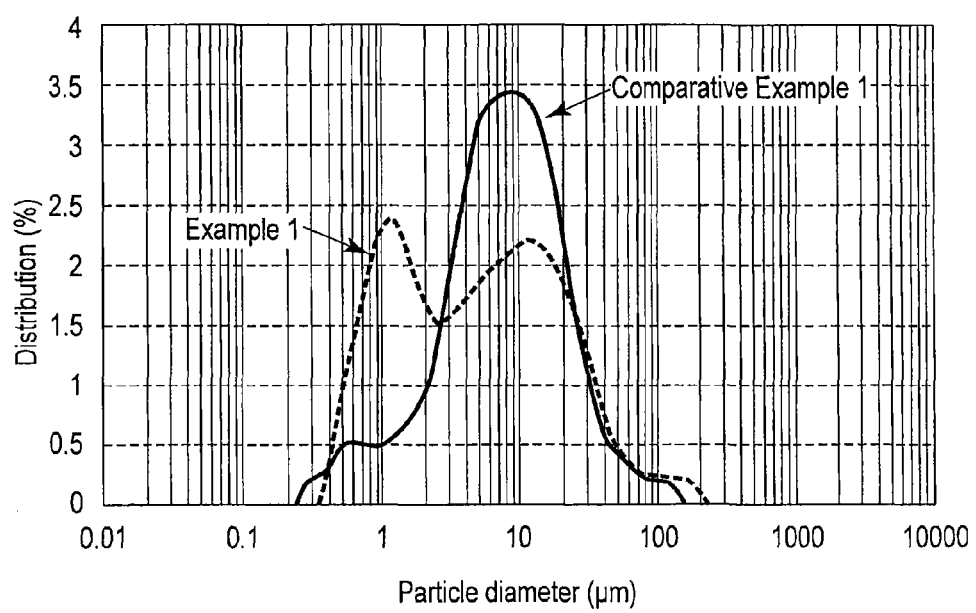
FIG. 8 is a graph showing particle size frequency distributions for Example 1 and Comparative Example 1.

FIG. 8 shows the particle size frequency distribution graphs of the electrodes according to Example 1 and Comparative Example 1. The particle size frequency distribution was measured by the laser diffraction and scattering method in the same manner as above to show it in terms of particle diameter frequency distribution based on volume. Example 1 has a first peak at a particle size of about 1 μm and a second peak at a particle size of about 10 μm. On the other hand, Comparative Example 1 has a peak only at a particle size of about 10 μm. This shows that an electrode having a first peak in a particle size of 0.3 to 3 μm, a second peak in a particle size of 5 to 20 μm, and a ratio $F_{P1}/F_{P2}$ of 0.4 to 2.3 as that of Example 1 can attain a high-rate capacity ratio.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A battery electrode comprising an active material layer and a current collector, wherein;

the active material layer contains an active material;

the active material contains particles of a monoclinic β-type titanium complex oxide and particles of a lithium titanate having spinel structure;

the average secondary particle diameter of the particles of a monoclinic β-type titanium complex oxide is from 5 μm to 20 μm;

the average secondary particle diameter of the particles of a lithium titanate having spinel structure is from 0.3 μm to 3 μm;

a first peak $P_1$ appears in a range of 0.3 μm to 3 μm and a second peak $P_2$ appears in a range of 5 μm to 20 μm in a particle size frequency distribution diagram when a particle size frequency distribution of particles contained in the active material layer is measured by the laser diffraction and scattering method;

the ratio $F_{P1}/F_{P2}$ of the frequency $F_{P1}$ of the first peak $P_1$ to the frequency $F_{P2}$ of the second peak $P_2$ is 0.4 to 2.3;

a peak P(020) appears in a range of 48.0° to 49.0° and a peak P(001) appears in a range of 12° to 16° in a powder X-ray diffraction diagram when the electrode is subjected to measurement by a powder X-ray diffractometry with a Cu-Kα ray source;

the ratio I(020)/I(001) of intensity I(020) of the peak P(020) to intensity I(001) of the peak P(001) is 0.89 to 1.1, and wherein the active material layer has a density of 2.18 g/cm³ to 2.48 g/cm³.

2. The battery electrode according to claim 1, wherein the active material layer has a pore volume of 0.20 ml/g to 0.25 ml/g.

3. The battery electrode according to claim 1, wherein the active material layer has a pore volume of 0.20 ml/g to 0.25 ml/g.

4. The battery electrode according to claim 1, wherein the active material layer has a density of 2.1 g/cm³ to 2.4 g/cm³.

5. The battery electrode according to claim 1, wherein the active material layer has a density of 2.1 g/cm³ to 2.4 g/cm³.

6. The battery electrode according to claim 2, wherein the active material layer has a density of 2.1 g/cm³ to 2.4 g/cm³.

7. The battery electrode according to claim 3, wherein the active material layer has a density of 2.1 g/cm³ to 2.4 g/cm³.

8. A nonaqueous electrolyte battery comprising:

a negative electrode constituted of the electrode according to claim 1;

a positive electrode; and a nonaqueous electrolyte.

9. A nonaqueous electrolyte battery comprising:

a negative electrode constituted of the electrode according to claim 1;

a positive electrode; and a nonaqueous electrolyte.

10. A nonaqueous electrolyte battery comprising:

a negative electrode constituted of the electrode according to claim 2;

a positive electrode; and a nonaqueous electrolyte.

11. A nonaqueous electrolyte battery comprising:

a electrode constituted of the electrode according to claim 4;

a positive electrode; and a nonaqueous electrolyte.

12. A nonaqueous electrolyte battery comprising:

a electrode constituted of the electrode according to claim 5;

a positive electrode; and a nonaqueous electrolyte.

13. A nonaqueous electrolyte battery comprising:

a electrode constituted of the electrode according to claim 6;

a positive electrode; and a nonaqueous electrolyte.

14. A nonaqueous electrolyte battery comprising:

a electrode constituted of the electrode according to claim 7;

a positive electrode; and a nonaqueous electrolyte.

15. A battery pack comprising:

the nonaqueous electrolyte battery according to claim 8; and a container accommodating the battery.

16. A battery pack comprising:

the nonaqueous electrolyte battery according to claim 9; and a container accommodating the battery.

17. A battery pack comprising:

the nonaqueous electrolyte battery according to claim 10; and a container accommodating the battery.

18. A battery pack comprising:

the nonaqueous electrolyte battery according to claim 11; and a container accommodating the battery.

19. A battery pack comprising:

the nonaqueous electrolyte battery according to claim 12; and a container accommodating the battery.

\* \* \* \* \*